United States Patent
Osanai et al.

(10) Patent No.: US 9,992,468 B2
(45) Date of Patent: Jun. 5, 2018

(54) IMAGE PROCESSING APPARATUS AND ITS ADJUSTMENT METHOD

(75) Inventors: Satoshi Osanai, Obu (JP); Hironori Sato, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 345 days.

(21) Appl. No.: 13/372,991

(22) Filed: Feb. 14, 2012

(65) Prior Publication Data

US 2012/0206600 A1 Aug. 16, 2012

(30) Foreign Application Priority Data

Feb. 15, 2011 (JP) ................................. 2011-029941

(51) Int. Cl.
*H04N 9/68* (2006.01)
*G06K 9/46* (2006.01)
*H04N 1/60* (2006.01)

(52) U.S. Cl.
CPC ............. *H04N 9/68* (2013.01); *G06K 9/4652* (2013.01); *H04N 1/6027* (2013.01); *H04N 1/6047* (2013.01)

(58) Field of Classification Search
CPC ...... H04N 5/332; H04N 9/045; H04N 1/6027; H04N 1/6047; H04N 9/68; G06K 9/4652; G09G 5/02

(Continued)

(56) References Cited

U.S. PATENT DOCUMENTS 5,850,254 A * 12/1998 Takano et al. ................. 348/148
8,023,736 B2    9/2011 Tsukada
(Continued)

FOREIGN PATENT DOCUMENTS

JP    2003-111716    4/2003
JP    2004-276165    10/2004
(Continued)

OTHER PUBLICATIONS

Office Action dated Jan. 29, 2013 in corresponding Japanese Application No. 2011-029941 with English translation.

*Primary Examiner* — Mohammed Jebari
*Assistant Examiner* — Maria Vazquez Colon
(74) *Attorney, Agent, or Firm* — Harness, Dickey & Pierce, P.L.C.

(57) ABSTRACT

In an image processing apparatus, an image acquisition unit acquires an image. A correction unit corrects pixel values of pixels composed of the acquired image by using correction coefficients to produce a correct image. An object recognition unit recognizes an object in the corrected image. A storage unit stores in advance standard color characteristics of a predetermined object which is a recognition target. A color characteristics acquisition unit acquires color characteristics of the predetermined object if the predetermined object is recognized by the object recognition unit. A comparison unit compares the color characteristics of the acquired object with the standard color characteristics of the same predetermined object stored in advance in the storage unit. An updating unit updates the correction coefficients used in the correction unit based on a result of comparison so as to reduce a difference between the color characteristics and the standard color characteristics.

10 Claims, 4 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 2002/0080998 | A1* | 6/2002 | Matsukawa | G06K 9/00818 |
| | | | | 382/103 |
| 2005/0195212 | A1 | 9/2005 | Kurumisawa et al. | |
| 2006/0066912 | A1* | 3/2006 | Kagaya | H04N 1/628 |
| | | | | 358/302 |
| 2006/0251320 | A1* | 11/2006 | Diederichs et al. | 382/165 |
| 2007/0047809 | A1* | 3/2007 | Sasaki | G06K 9/00791 |
| | | | | 382/170 |
| 2008/0055473 | A1* | 3/2008 | Osawa | H04N 9/68 |
| | | | | 348/577 |
| 2008/0193011 | A1 | 8/2008 | Hayashi et al. | |
| 2009/0041347 | A1* | 2/2009 | Iguchi | G06K 9/00234 |
| | | | | 382/167 |

FOREIGN PATENT DOCUMENTS

| | | |
|---|---|---|
| JP | 2005-234892 | 9/2005 |
| JP | 3867988 | 10/2006 |
| JP | 4098599 B2 * | 6/2008 |
| JP | 2008-306498 | 12/2008 |
| JP | 4288530 | 7/2009 |
| JP | 4364239 | 8/2009 |
| JP | 2010-196653 | 9/2010 |

* cited by examiner

IMAGE PROCESSING APPARATUS AND ITS ADJUSTMENT METHOD

CROSS-REFERENCE TO RELATED APPLICATION

This application is based on and claims the benefit of priority from earlier Japanese Patent Application No. 2011-029941 filed Feb. 15, 2011, the description of which is incorporated herein by reference.

BACKGROUND OF THE INVENTION

Technical Field of the Invention

The present invention relates to an image processing apparatus and its adjustment method, and in particular to an image processing apparatus mounted on a vehicle and its adjustment method.

Related Art

It is well known that an image processing apparatus is installed in a vehicle to carry out image recognition of a preceding vehicle or an oncoming vehicle by picking up an image and acquiring image data in the forward direction of the vehicle using a camera installed in the vehicle. Such an image processing apparatus, as disclosed in JP-A-2010-196653, for example, is also well known to control a lighting device of the vehicle after carrying out image recognition of the preceding vehicle or the oncoming vehicle.

Color characteristics of the image data acquired by such an image processing apparatus may vary depending on the image processing apparatus installed in the vehicle, due to various factors (e.g., characteristics such as of a windshield, lens, polarizing filter, OLPF (optical low pass filter), color filter and imager). In this case, a preceding vehicle or an oncoming vehicle may not be correctly recognized in the acquired image data.

In addition, color characteristics of the image data acquired by an image processing apparatus may be deviated from the true and correct color characteristics due to the age deterioration of the image pickup element and the lens of the camera. In this case as well, a preceding vehicle or an oncoming vehicle may not be correctly recognized in the acquired image data.

SUMMARY

The present disclosure has been made in light of the problems set forth above and provides an image processing apparatus and an adjustment method for the same enabling accurate recognition of a target to be recognized, despite the variation in the characteristics of the components of the image processing apparatus or the aged deterioration of the components.

According to a first exemplary aspect of the present disclosure, there is provided an image processing apparatus, comprising: an image acquisition unit that acquires an image; a correction unit that corrects pixel values of the image acquired by the image acquisition unit by using correction coefficients to produce a corrected image; an object recognition unit that recognizes an object in the corrected image; a storage unit that stores in advance standard color characteristics of a predetermined object which is a recognition target; a color characteristics acquisition unit that if the predetermined object is recognized by the object recognition unit, acquires color characteristics of the recognized predetermined object; a comparison unit that compares the color characteristics of the recognized object acquired by the color characteristics acquisition unit with the standard color characteristics of the same predetermined object stored in advance by the storage unit; and an updating unit that updates the correction coefficients used by the correction unit based on a result of comparison of the color characteristics and the standard color characteristics so as to reduce a difference between the color characteristics and the standard color characteristics.

According to the image processing apparatus of the present disclosure, the correction coefficients are updated in such a way that the color characteristics of a target to be recognized in an image acquired by the image acquisition unit and corrected by the correction unit will have only a small difference from the color characteristics of the same target retained in advance.

Thus, when a component (e.g., image pickup element or lens) of the image acquisition unit is deteriorated due to aging, the color characteristics of the image data are retained to have true and correct color characteristics. As a result, image recognition is carried out with high accuracy.

According to the image processing apparatus of the present disclosure, the correction coefficients may be updated when a predetermined updating condition is met or may be updated, on a needed basis, when updating instructions are received from the user.

According to a second exemplary aspect of the present disclosure, there is provided a method for adjusting an image processing apparatus that includes an image acquisition unit which acquires an image, a correction unit that corrects pixel values of an acquired image by using correction coefficients, and an object recognition unit that recognizes an object in a corrected image whose pixel values are corrected, the method comprising: storing standard color characteristics of an image of a predetermined standard light source in the storage unit in advance; acquiring, at the image acquisition unit, an image of the predetermined standard light source; correcting, at the correction unit, the acquired image; comparing, at a comparison unit, color characteristics of the corrected image with the standard color characteristics of the image stored in advance in the storage unit; and updating, at an updating unit, the correction coefficients based on a result of comparison of the corrected image color characteristics and the standard color characteristics so as to reduce a difference between the color characteristics and the standard color characteristics.

According to an image processing apparatus of the present disclosure, the correction coefficients are updated in such a way that the color characteristics of the image obtained by correcting the standard light image will have little difference from the color characteristics of the standard light image.

The color characteristics of the image acquired by an image processing apparatus may vary depending on the image processing apparatus installed. The variation is caused by various factors (e.g., characteristics such as of a windshield, lens, polarizing filter, OLPF (optical low pass filter), color filter and imager). In the present disclosure, the variation caused by such factors is cancelled by the correction process performed by the correction unit. Thus, the color characteristics of the image used for image recognition are rendered to have less variation. As a result, the image processing apparatus is able to recognize a target with high accuracy.

According to the image processing apparatus of the present disclosure, the adjustment may be carried out before shipment or at different timing (e.g., after lapse of a predetermined time from shipment).

DETAILED DESCRIPTION OF THE PREFERRED EMBODIMENTS

With reference to the accompanying drawings, hereinafter is described an image processing apparatus according to an exemplary embodiment of the present invention.

Figure 1:
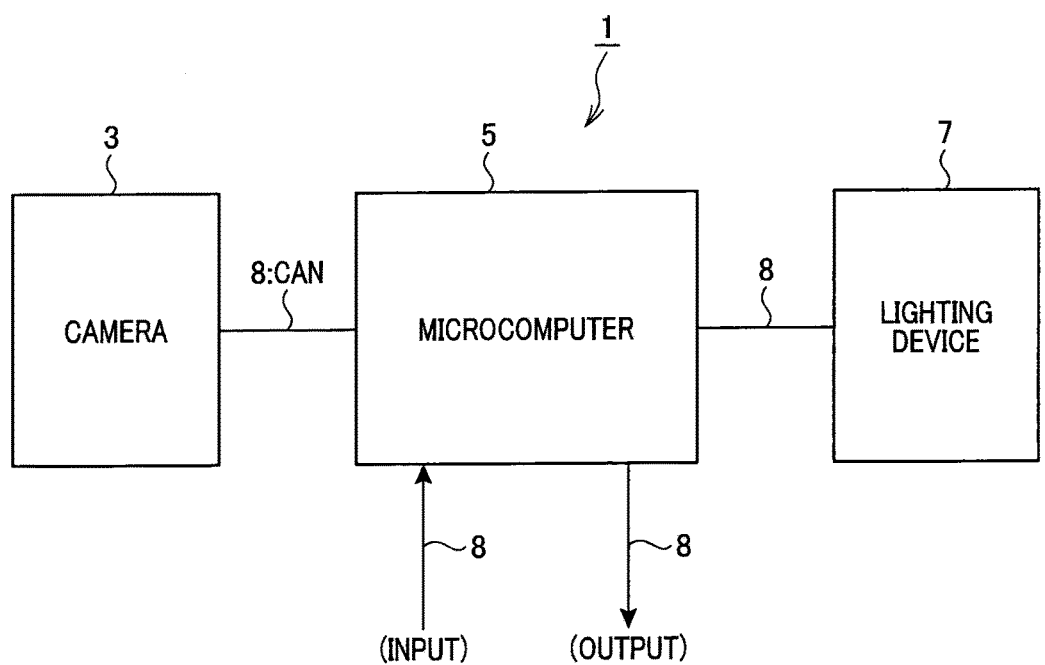
FIG. 1 is a schematic block diagram illustrating a configuration of an image processing apparatus according to an exemplary embodiment of the present invention.

Referring, first, to FIG. 1, a configuration of an image processing apparatus 1 according to the embodiment is described. FIG. 1 is a schematic block diagram illustrating the configuration of the image processing apparatus 1.

The image processing apparatus shown in FIG. 1 is an on-vehicle device installed in a vehicle. The image processing apparatus 1 includes a camera (image acquisition unit) 3 and a microcomputer (processor) 5. The camera 3 picks up an image and acquires the image data in the forward direction of the vehicle that installs the camera 3. The microcomputer 5 carries out image processing, which will be described later, using the image data. The microcomputer 5 is connected to a lighting device 7 (on-board device), such as headlamps, fog lamps and rear combination lamps, of the vehicle.

The microcomputer 5 has a well-known configuration and includes a CPU (central processing unit), ROM (read only memory) and RAM (random access memory). The microcomputer 5 carries out the image processing for the image data acquired by the camera 3 by executing a predetermined program, which will be described later. The microcomputer 5 then controls the lighting device 7 according to the results of the image processing.

The camera 3, the microcomputer 5 and the lighting device 7 are connected to each other via CAN (Controller Area Network) 8 that is a protocol for communication within a vehicle. The microcomputer 5 is inputted with navigation information from a navigation device, not shown, and vehicle information (e.g., vehicle speed and yaw rate) from sensors, not shown, via CAN 8. The microcomputer 5 is able to output various signals indicating the results of image processing not only to the lighting device 7 but also to other devices.

Figure 2:
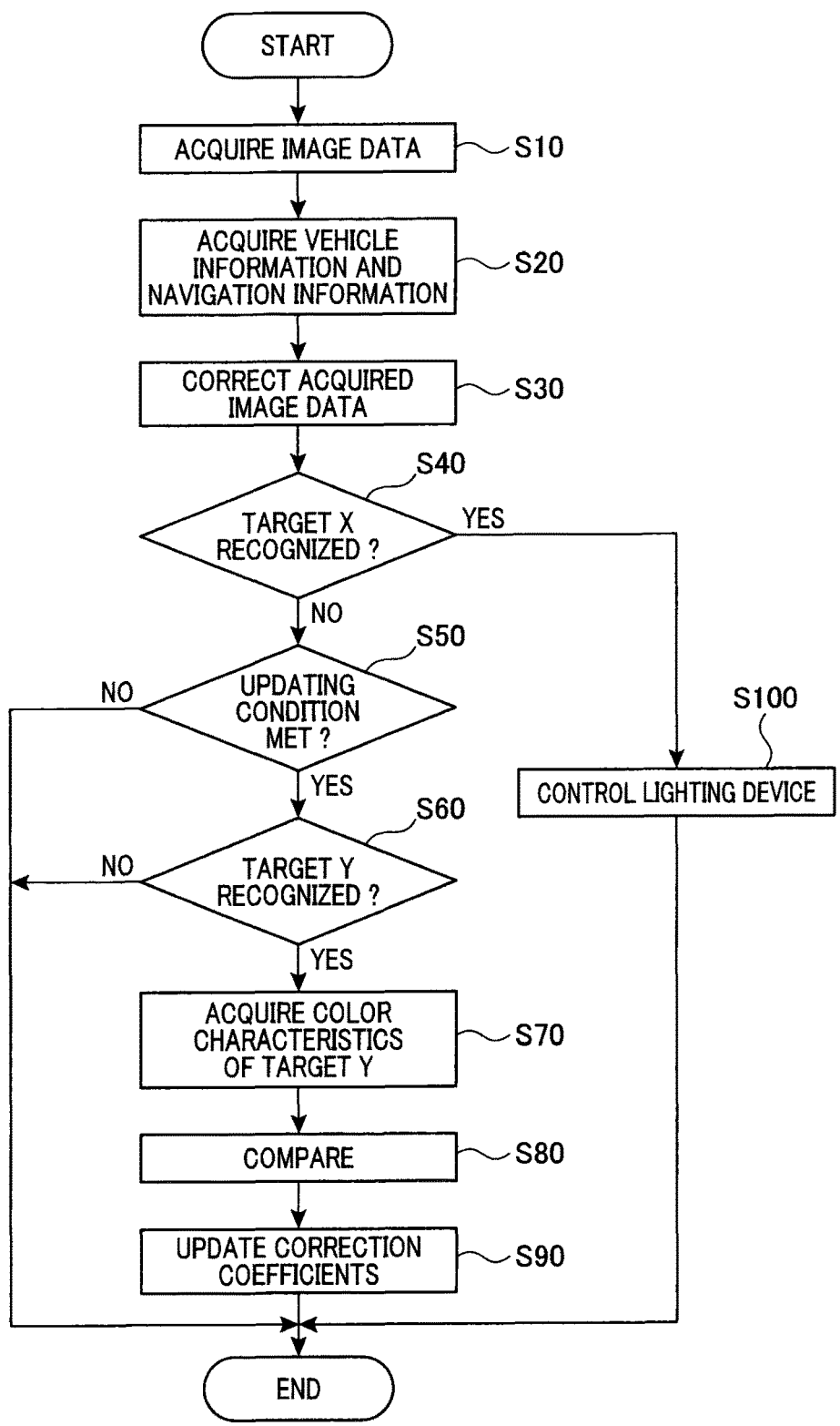
FIG. 2 is a flow diagram illustrating a process performed by the image processing apparatus illustrated in FIG. 1.

The microcomputer 5 functions as the correction unit, object recognition unit, color characteristics acquisition unit, comparison unit and updating unit of the present embodiment by executing the following process in FIG. 2.

Referring to FIG. 2, a process performed by the image processing apparatus 1 (microcomputer 5 in particular) is described. FIG. 2 is a flow diagram illustrating the process. The program for performing steps S10 to S100 indicated in the flow diagram of FIG. 2, in the present embodiment, is stored in the ROM in advance and executed by the CPU of the microcomputer 5.

Figure 4:
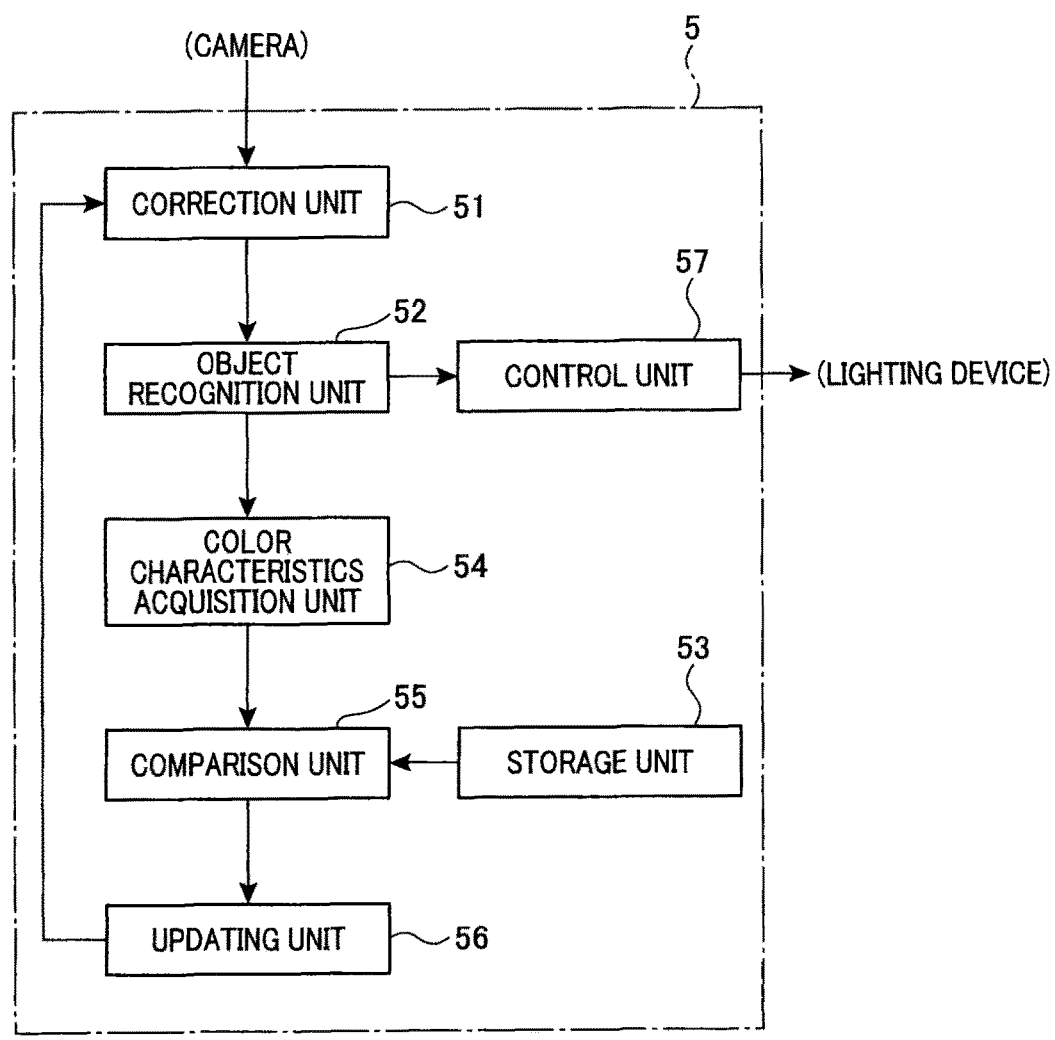
FIG. 4 is a block diagram showing a functional configuration of the microcomputer shown in FIG. 1.

FIG. 4 shows a functional configuration of the microcomputer 5. In the example of FIG. 4, the microcomputer 5 includes a correction unit 51, an object recognition unit 52, a storage unit 53, a color characteristics acquisition unit 54, a comparison unit 55, an updating unit 56, and a control unit 57.

The correction unit 51 corrects pixel values of pixels of the image acquired by the camera 3 by using correction coefficients. The object recognition unit 52 recognizes an object in a corrected image whose pixel values are corrected by the correction unit 51. The storage unit 53 stores in advance standard color characteristics of a predetermined object which is regarded as a recognition target. The color characteristics acquisition unit 54 acquires color characteristics of the predetermined object, if the predetermined object is recognized by the object recognition unit 52. The comparison unit 55 compares the color characteristics of the predetermined object acquired by the color characteristics acquisition unit 54 with the standard color characteristics of the same predetermined object stored in advance by the storage unit 53. The updating unit 56 updates the correction coefficients used in the correction unit based on a result of comparison of the color characteristics and the standard color characteristics so as to reduce a difference between the color characteristics and the standard color characteristics. The control unit 57 controls a state of the lighting device 7 (on-board device) mounted on the vehicle based on the object recognized by the object recognition unit 52.

At step S10, the image of the landscape in the forward direction of the vehicle is picked up by the camera 3 and the image data is acquired. The image data is composed of a plurality of pixels each of which retains any one of pixel values of from 0 to 255. The pixels include those pixels which retain pixel values equivalent to the intensity of the light that has passed through a filter which mainly allows transmission of light having a wavelength of red light (hereinafter these pixels are referred to as "R pixels"). The pixels also include those pixels which retain pixel values equivalent to the intensity of the light that has passed through a filter which mainly allows transmission of light having a wavelength of green light (hereinafter these pixels are referred to as "G pixels"). The pixels further include those pixels which retain pixel values equivalent to the intensity of the light that has passed through a filter which mainly allows transmission of light having a wavelength of blue light (hereinafter these pixels are referred to as "B pixels"). Specifically, in the image data, the R pixels retain red pixel values, the G pixels retain green pixel values and the B pixels retain blue pixel values, and these R, G and B pixels are arrayed in a Bayer array format.

At step S20, the microcomputer 5 acquires, via the CAN 8, navigation information from the navigation device, not shown, and vehicle information (e.g., vehicle speed and yaw rate) from the sensors, not shown.

At step S30, the microcomputer 5 corrects the image data acquired at step S10 (this process is performed by, e.g., the correction unit 51 shown in FIG. 4). The correction of the image data is carried out as follows.

Each of the pixel values retained by the respective pixels composing the image data is multiplied by a correction coefficient to calculate a corrected pixel value. The R, G and B pixels have respective suitable correction coefficients. Specifically, The R pixels have a correction coefficient $K_R$. The G pixels have a correction coefficient $K_G$. The B pixels have a correction coefficient $K_B$. Regarding the R pixels, the correction coefficient $K_R$ is multiplied with the original R pixel value (pixel value before correction) to calculate a corrected pixel value. Regarding the G pixels, the correction coefficient $K_G$ is multiplied with the original G pixel value to calculate a corrected pixel value. Regarding the B pixels, the correction coefficient $K_B$ is multiplied with the original B pixel value to calculate a corrected pixel value.

Figure 3:
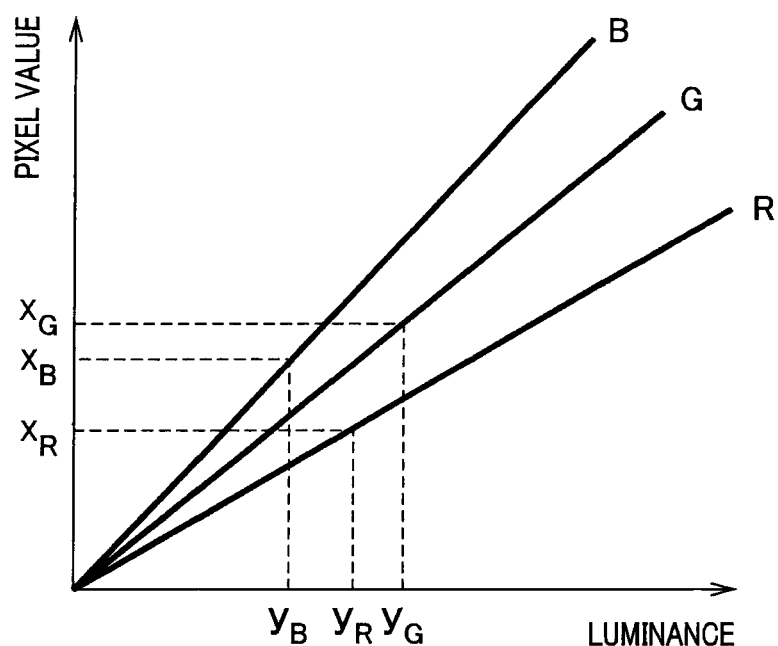
FIG. 3 is a graph explaining conversion lines of pixel value and luminance.

FIG. 3 is a graph explaining conversion lines of pixel value and luminance. Using the conversion relationships (stored in advance in the ROM of the microcomputer 5) shown in FIG. 3, a corrected pixel value is converted into a luminance. The R, G and B pixels have their own respective conversion lines. The conversion line of the R pixels is used for converting a pixel value $X_R$ into a luminance $y_R$. The conversion line of the G pixels is used for converting a pixel value $X_G$ into a luminance $y_G$. The conversion line of the B pixels is used for converting a pixel value $X_B$ into a luminance $y_B$.

Through the steps described above, the pixels in the image data have luminances corresponding to the respective pixels. In other words, the R pixels retain the luminance of R, the G pixels retain the luminance of G and the B pixels retain the luminance of B.

Finally, performing a well-known demosaicing process, R, G or B luminance is calculated for each of the pixels. Through the steps described above, each of the pixels retains R, G or B luminance.

At step S40, a process of image recognition is performed to determine whether or not a given target X to be recognized (hereinafter referred to as "target X") has been recognized in the image data corrected at step S30 (this process is performed by, e.g., the object recognition unit 52 shown in FIG. 4). The target X corresponds to an oncoming vehicle or a preceding vehicle. The image recognition of the target X is performed through a well-known process based on the navigation information (vehicle location information) as well as the vehicle information (e.g., vehicle speed and yaw rate) inputted at step S20. If it is determined that the target X has not been recognized, control proceeds to step S50. If it is determined that the target X has been recognized, control proceeds to step S100.

At step S50, it is determined whether or not a predetermined updating condition is met. The predetermined updating condition may be any one of the following items (a) to (c).

(a) Predetermined time has passed since step S90, which will be described later, was executed last.

(b) Predetermined time has passed since the ignition was turned on.

(c) The location of the vehicle according to the navigation information obtained from the navigation device, not shown, coincides with the given location.

As a result of the determination, if any one of the updating conditions is met, control proceeds to step S60, and if not, the present process is terminated.

At step S60, a well-known process of image recognition is performed to determine whether or not a given target Y to be recognized (hereinafter referred to as "target Y") has been recognized in the image data corrected at step S30 (this process is performed by, e.g., the object recognition unit 52 shown in FIG. 4). The target Y in the present embodiment corresponds to any one of taillight, green light of traffic light and road sign background. The target Y has a fixed color and a fixed lightness. If the target Y has been recognized, control proceeds to step S70, and if not, the present process is terminated.

At step S70, of the image data corrected at step S30, color characteristics of the portion corresponding to the target Y recognized at step S60 are acquired (hereinafter these color characteristics are referred to as "color characteristics C") (this process is performed by, e.g., the color characteristics acquisition unit 54 shown in FIG. 4).

At step S80, the color characteristics C acquired at step S70 are compared with standard color characteristics (hereinafter referred to as "standard color characteristics D") that have been stored in advance in the ROM of the microcomputer 5 as color characteristics of the target Y recognized at step S60 (this process is performed by, e.g., the comparison unit 55 shown in FIG. 4).

The color characteristics are compared in a predetermined color space, e.g., L*u*v* color space (JIS Z8729) or L*a*b* color space (JIS Z8729) specified by CIE (International Commission on Illumination). These color spaces are a uniform color space in which luminance (lightness, brightness) and chromaticity difference between two colors is substantially proportional to their perceived difference.

In the L*a*b* color space, L* indicates lightness (L*=0 indicates black and L*=100 indicates white), and a* and b* are chromaticity coordinates (a* has negative values that indicate green and positive values that indicate magenta, and b* has negative values that indicate blue and positive values that indicate yellow). The values of L*a*b* can be acquired from the image data that has been corrected using the correction coefficients $K_R$, $K_G$ and $K_B$ at step S30. For example, values of L*a*b* can be calculated from XYZ tristimulus values specified by CIE, which can be acquired from the image data corrected at step S30, by using well-known conversion formula in the related art.

In the L*u*v* color space, L* indicates lightness, and u* and v* are chromaticity coordinates. The L*u*v* color space has the same L* as L*a*b* color space, but has a different representation of the chromaticity components. The values of L*u*v* can be acquired from the image data that has been corrected using the correction coefficients $K_R$, $K_G$ and $K_B$ at step S30. For example, values of L*u*v* can be calculated from XYZ tristimulus values specified by CIE, which can be acquired from the image data corrected at step S30, by using well-known conversion formula in the related art.

The comparison of the color characteristics is performed using the standard color characteristics D of an object which is identical with the target Y recognized at step S60. Specifically, if the target Y recognized at step S60 is a vehicle taillight, the standard color characteristics D of vehicle taillight are used. If the target Y recognized at step S60 is the green light of a traffic light, the standard color characteristics D of the green light of traffic light are used. If the target Y recognized at step S60 is a road sign background, the standard color characteristics D of road sign background are used.

At step S90, the correction coefficients $K_R$, $K_G$ and $K_B$ are updated so that the color characteristics C acquired at step S70 will have only a small difference from the standard color characteristics D (this process is performed by, e.g., the updating unit 56 shown in FIG. 4).

For example, the updating process may be either of the following processes shown in the items (i) and (ii).

(i) The color characteristics C acquired at step S70 are compared with the standard color characteristics D to acquire the extent of deviation of the color characteristics C from the standard color characteristics D regarding the direction and the level in the color space. According to the resultant extent of deviation, the correction coefficients $K_R$, $K_G$ and $K_B$ are updated using a predetermined pattern.

(ii) The following steps are repeatedly performed: a step of gradually varying the values of the correction coefficients $K_R$, $K_G$ and $K_B$; a step of acquiring the color characteristics C of the target Y using the varied correction coefficients $K_R$, $K_G$ and $K_B$; and a step of comparing the color characteristics C of the target Y with the standard color characteristics D, as compared at step S80, and calculating the difference. Then, the correction coefficients $K_R$, $K_G$ and $K_B$ that minimize the difference between the color characteristics C and the standard color characteristics D are set as updated correction coefficients $K_R$, $K_G$ and $K_B$.

In the event the difference of the color characteristics C acquired at step S70 from the standard color characteristics D is less than a predetermined value, the correction coefficients $K_R$, $K_G$ and $K_B$ may be refrained from being updated.

On the other hand, if it is determined, at step S40, that the target X has been recognized, control proceeds to step S100 where the lighting device 7 are controlled (this process is performed by, e.g., the control unit 57 shown in FIG. 4). Specifically, when the lighting device 7 is in a state of emitting high beams, the high beams are turned to low beams.

Hereinafter is described a method of adjusting the image processing apparatus 1.

First, in a state where the image processing apparatus 1 is installed in the vehicle, standard light is emitted to the camera 3 from the forward direction of the vehicle via the windshield. If the adjustment is performed at nighttime, "standard light A (color temperature 2848K) of JIS standard" is used. If the adjustment is performed at daytime, "standard light D65 (color temperature about 6500 K)" is used.

In this case, the image processing apparatus 1 acquires image data of the standard light through the processing of step S10. Then, the image processing apparatus 1 corrects the image data through the processing of step S30.

The image processing apparatus 1 then retrieves the corrected image data from the microcomputer 5 to compare the color characteristics of the corrected image data (hereinafter referred to as "color characteristics A") with the well-known standard color characteristics of the standard light (hereinafter referred to as "standard color characteristics B"). Similar to the above, the color characteristics A and B are compared in the color space, e.g., L*u*v* color space (JIS Z8729) or L*a*b* color space (JIS Z8729), as described above. These color spaces are a uniform color space in which luminance (lightness, brightness) and chromaticity difference between two colors is substantially proportional to their perceived difference.

Then, according to the results of the comparison of the color characteristics A with the standard color characteristics B, the correction coefficients $K_R$, $K_G$ and $K_B$ are updated so that there will be only a small difference between the color characteristics A and the standard color characteristics B.

For example, the updating process may be either of the following processes shown in the items (i) and (ii).

(i) The color characteristics A are compared with the standard color characteristics B to acquire the extent of deviation of the former from the latter regarding the direction and the level in the color space. According to the resultant extent of deviation, the correction coefficients $K_R$, $K_G$ and $K_B$ are updated using a predetermined pattern.

(ii) The following steps are repeatedly performed: a step of gradually varying the values of the correction coefficients $K_R$, $K_G$ and $K_B$; a step of acquiring the color characteristics A using the varied correction coefficients $K_R$, $K_G$ and $K_B$; and a step of comparing the color characteristics A with the standard color characteristics B, as compared at step S80, and calculating the difference. Then, the correction coefficients $K_R$, $K_G$ and $K_B$ that minimize the difference between the color characteristics A and the standard color characteristics B are set as updated correction coefficients $K_R$, $K_G$ and $K_B$.

In the event the difference of the color characteristics A from the standard color characteristics B is less than a predetermined value, the correction coefficients $K_R$, $K_G$ and $K_B$ may be refrained from being updated.

As described above, the image processing apparatus 1 updates the correction coefficients $K_R$, $K_G$ and $K_B$ so that the color characteristics C of the target Y in the image data will have only a small difference from the standard color characteristics D.

Therefore, when the camera 3 or the image pickup element is deteriorated due to aging, the image data is retained to have the true and correct color characteristics. As a result, the target X is accurately recognized at step S40.

In the method of adjusting the image processing apparatus 1 described above, standard light is picked up by the camera 3 of the image processing apparatus 1. Then, the color factors $K_R$, $K_G$ and $K_B$ are updated so that the color characteristics A of the image data corrected at step S30 will have only a small difference from the standard color characteristics B.

The color characteristics of the image data acquired by the image processing apparatus 1 may vary depending on the image processing apparatus 1 installed. The variation is caused by various factors (e.g., characteristics such as of a windshield, lens, polarizing filter, OLPF (optical low pass filter), color filter and imager). In the present invention, the variation caused by such factors is cancelled by the process of correcting the acquired image (processing at step S30). Thus, the color characteristics of the image data used for image recognition are rendered to have no variation. As a result, the image processing apparatus 1 is able to recognize the target X with high accuracy at step S40 described above.

Further, the color characteristics of images acquired by the camera 3 are not required to be strictly uniform between the images, and thus the camera 3 produced at low cost may be used.

The present invention is not limited to the embodiment described above. As a matter of course, the present invention may be implemented in various modes within a scope not departing from the spirit of the invention.

For example, at step S50 described above, an updating condition may not be necessarily provided. Instead, the determination made at step S50 may always be YES. Further, the image processing apparatus 1 may carry out the process of updating the correction coefficients $K_R$, $K_G$ and $K_B$ in response to the user's instructions.

The determinations at steps S50 and S60 may be made such that the processings at steps S70 to S90 are performed on condition that the vehicle is at a predetermined location and that a predetermined single target Y (or the target Y identical with the target recognized in the previous process) has been recognized. Thus, the accuracy of correction is further enhanced.

The process of correction using the correction coefficients $K_R$, $K_G$ and $K_B$ may be linear or nonlinear. In other words, the values of the correction coefficients $K_R$, $K_G$ and $K_B$ may be fixed without depending on the pixel values, or may be varied according to the pixel values.

The image processing apparatus 1 may control not only the lighting device 7 but also other devices, based on the results of the image recognition.

Further, the comparison of the color characteristics may not be necessarily carried out in the color spaces of L*u*v*

(JIS Z8729) or L*a*b* (FIS Z8729). Any color paces may be used if only they are a uniform color space in which, e.g., luminance (lightness, brightness) and chromaticity difference between two colors is substantially proportional to their perceived difference.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An image processing apparatus, comprising:
   an image acquisition unit that acquires an image;
   a correction unit that corrects pixel values of the image acquired by the image acquisition unit by using correction coefficients to produce a corrected image, wherein the pixel values include pixel values for red, green, and blue pixels of image data configuring the image, the correction coefficients include a designated correction coefficient for a red pixel, a green pixel, and a blue pixel, the corrected image being configured by image data having corrected pixel values that are calculated by multiplying the pixel values of the image data with respective designated correction coefficients for the red pixel, the green pixel, and the blue pixel, the designated correction coefficient being predetermined and independent of ambient light;
   an object recognition unit that recognizes an object in the corrected image;
   a storage unit that stores in advance standard color characteristics of a predetermined object that is a recognition target, the recognition target being a predetermined light with a fixed color;
   a color characteristics acquisition unit that if the object is recognized by the object recognition unit, acquires color characteristics of the recognized object;
   a comparison unit that compares the color characteristics of the recognized object acquired by the color characteristics acquisition unit with the standard color characteristics of the same predetermined object stored in advance by the storage unit; and
   an updating unit that updates the designated correction coefficients of the red pixel, the green pixel, and the blue pixel used by the correction unit based on a result of comparison of the color characteristics and the standard color characteristics so as to reduce a difference between the color characteristics and the standard color characteristics, wherein:
   the comparison unit compares the color characteristics with the standard color characteristics in a predetermined color space; and
   the updating unit acquires an extent of deviation of the color characteristics from the standard color characteristics in the color space, and updates the designated correction coefficients of the red pixel, the green pixel, and the blue pixel based on the extent of deviation in the color space.

2. An image processing apparatus comprising:
   an image acquisition unit that acquires an image;
   a correction unit that corrects pixel values of the image acquired by the image acquisition unit by using correction coefficients to produce a corrected image, wherein the pixel values include pixel values for red, green, and blue pixels of image data configuring the image, the correction coefficients include a designated correction coefficient for a red pixel, a green pixel, and a blue pixel, the corrected image being configured by image data having corrected pixel values that are calculated by multiplying the pixel values of the image data with respective designated correction coefficients for the red pixel, the green pixel, and the blue pixel;
   an object recognition unit that recognizes an object in the corrected image;
   a storage unit that stores in advance standard color characteristics of a predetermined object that is a recognition target, the recognition target being a predetermined light with a fixed color;
   a color characteristics acquisition unit that if the object is recognized by the object recognition unit, acquires color characteristics of the recognized object;
   a comparison unit that compares the color characteristics of the recognized object acquired by the color characteristics acquisition unit with the standard color characteristics of the same predetermined object stored in advance by the storage unit; and
   an updating unit that updates the designated correction coefficients of the red pixel, the green pixel, and the blue pixel used by the correction unit based on a result of comparison of the color characteristics and the standard color characteristics so as to reduce a difference between the color characteristics and the standard color characteristics, wherein:
   the comparison unit compares the color characteristics with the standard color characteristics in a predetermined color space; and
   the updating unit gradually varies the designated correction coefficients of the red pixel, the green pixel, and the blue pixel, acquires the color characteristics of the predetermined object using the varied designated correction coefficients of the red pixel, the green pixel, and the blue pixel, compares the color characteristics with the standard color characteristics in the color space, calculates a difference between the color characteristics and the standard color characteristics in the color space, and sets the designated correction coefficients of the red pixel, the green pixel, and the blue pixel that minimizes the difference as updated correction coefficients.

3. The image processing apparatus according to claim 1, wherein:
   the image acquisition unit is a camera mounted on a vehicle;
   the correction unit, the object recognition unit, the storage unit, the color characteristics acquisition unit, the comparison unit, and the updating unit are included in at least one processor mounted on vehicle; and
   the processor includes a control unit that controls a state of an on-board device mounted on the vehicle based on the object recognized by the object recognition unit.

4. A method for adjusting an image processing apparatus that includes an image acquisition unit which acquires an image, a correction unit that corrects pixel values of pixels composed of an acquired image by using correction coefficients, the pixel values including pixel values for red, green, and blue pixels of image data configuring the image, the correction coefficients including a designated correction coefficient for a red pixel, a green pixel, and a blue pixel, a corrected image being configured by image data having corrected pixel values that are calculated by multiplying the pixel values of the image data with respective designated correction coefficients for the red pixel, the green pixel, and the blue pixel, and an object recognition unit that recognizes an object in the corrected image whose pixel values are corrected, the method comprising, the designated correction coefficient being predetermined and independent of ambient light:

storing standard color characteristics of an image of a predetermined standard light source in a storage unit in advance;

acquiring, at the image acquisition unit, an image of the predetermined standard light source;

correcting, at the correction unit, the acquired image of the predetermined standard light source;

comparing, at a comparison unit, color characteristics of the corrected image of the predetermined standard light source with the standard color characteristics of the image of the predetermined standard light source stored in advance in the storage unit; and updating, at an updating unit, the designated correction coefficients of the red pixel, the green pixel, and the blue pixel based on a result of comparison of the color characteristics of the corrected image of the predetermined standard light source and the standard color characteristics of the image of the predetermined standard light source so as to reduce a difference between the color characteristics of the corrected image of the predetermined standard light source and the standard color characteristics of the image of the predetermined standard light source, wherein:

in the comparing at the comparison unit, the color characteristics are compared with the standard color characteristics in a predetermined color space; and in the updating at the updating unit, an extent of deviation of the color characteristics from the standard color characteristics in the color space is acquired, and the correction coefficients for red, green, and blue pixels are updated based on the extent of deviation in the color space.

5. A method for adjusting an image processing apparatus that includes an image acquisition unit which acquires an image, a correction unit that corrects pixel values of pixels composed of an acquired image by using correction coefficients, the pixel values including pixel values for red, green, and blue pixels of image data configuring the image, the correction coefficients including a designated correction coefficient for a red pixel, a green pixel, and a blue pixel, a corrected image being configured by image data having corrected pixel values that are calculated by multiplying the pixel values of the image data with respective designated correction coefficients for the red pixel, the green pixel, and the blue pixel, and an object recognition unit that recognizes an object in the corrected image whose pixel values are corrected, the method comprising:

storing standard color characteristics of an image of a predetermined standard light source in a storage unit in advance;

acquiring, at the image acquisition unit, an image of the predetermined standard light source;

correcting, at the correction unit, the acquired image of the predetermined standard light source;

comparing, at a comparison unit, color characteristics of the corrected image of the predetermined standard light source with the standard color characteristics of the image of the predetermined standard light source stored in advance in the storage unit; and updating, at an updating unit, the designated correction coefficients of the red pixel, the green pixel, and the blue pixel based on a result of comparison of the color characteristics of the corrected image of the predetermined standard light source and the standard color characteristics of the image of the predetermined standard light source so as to reduce a difference between the color characteristics of the corrected image of the predetermined standard light source and the standard color characteristics of the image of the predetermined standard light source, wherein:

in the comparing at the comparison unit, the color characteristics are compared with the standard color characteristics in a predetermined color space; and in the updating at the updating unit, the designated correction coefficients of the red pixel, the green pixel, and the blue pixel are gradually varied, the color characteristics of the predetermined standard light source are acquired using the varied designated correction coefficients of the red pixel, the green pixel, and the blue pixel, the color characteristics are compared with the standard color characteristics in the color space, a difference between the color characteristics and the standard color characteristics in the color space is calculated, and the designated correction coefficients of the red pixel, the green pixel, and the blue pixel that minimize the difference are set as updated correction coefficients.

6. The method according to claim 4, wherein:
the image acquisition unit is a camera mounted on a vehicle;

the correction unit, the object recognition unit, the storage unit, the comparison unit, and the updating unit are included in at least one processor mounted on vehicle; and an on-board device that is mounted on the vehicle is controlled through a control unit of the processor based on the object recognized by the object recognition unit.

7. The image processing apparatus according to claim 1, wherein:

the storage unit stores in advance standard characteristic of a plurality of different predetermined objects, each object being a recognition target, the recognition target being a predetermined light with a fixed color; and the comparison unit compares the color characteristic of the recognized object with the color characteristic of a matching one of the plurality of different predetermined objects.

8. The image processing apparatus according to claim 7, wherein the plurality of different predetermined objects includes at least one of a vehicle taillight, a traffic light and a road sign.

9. The image processing apparatus according to claim 1, wherein:

the storage unit stores in advance a standard characteristic of a predetermined object, the predetermined object being a recognition target and corresponding to a vehicle taillight, the recognition target having a predetermined light with a fixed color; and the comparison unit compares the color characteristic of the recognized object with the color characteristic of the predetermined object.

10. The image processing apparatus according to claim 9, wherein:

the storage unit stores in advance a standard characteristic of an additional predetermined object, the additional predetermined object being an additional recognition target and corresponding to at least one of a traffic light and a road sign, the additional recognition target having an additional predetermined light with an additional fixed color; and the comparison unit compares the color characteristic of the recognized object with the color characteristic of a matching one of the predetermined object and the additional predetermined object.

\* \* \* \* \*